United States Patent
Barenys et al.

(10) Patent No.: US 7,085,863 B2
(45) Date of Patent: Aug. 1, 2006

(54) I²C DEVICE INCLUDING BUS SWITCHES AND PROGRAMMABLE ADDRESS (75) Inventors: Michael Anton Barenys, Austin, TX (US); Stephan Otis Broyles, Austin, TX (US); Robert Allan Faust, Austin, TX (US); Joel Gerard Goodwin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 10/698,065

(22) Filed: Oct. 30, 2003

(65) Prior Publication Data

US 2005/0097255 A1   May 5, 2005

(51) Int. Cl.
*G06F 13/00*   (2006.01)
*G06F 11/07*   (2006.01)

(52) U.S. Cl. ............ 710/104; 710/107; 710/305; 710/316; 714/43

(58) Field of Classification Search ............ None
See application file for complete search history.

(56) References Cited

U.S. PATENT DOCUMENTS

| | | | | |
|---|---|---|---|---|
| 5,572,685 A | * | 11/1996 | Fisher et al. | 710/107 |
| 5,892,933 A | * | 4/1999 | Voltz | 710/316 |
| 5,946,495 A | * | 8/1999 | Scholhamer et al. | 713/300 |
| 6,081,863 A | * | 6/2000 | Kelley et al. | 710/312 |
| 6,092,138 A | * | 7/2000 | Schutte | 710/113 |
| 6,147,967 A | * | 11/2000 | Ying et al. | 370/222 |
| 6,182,178 B1 | * | 1/2001 | Kelley et al. | 710/314 |
| 6,233,635 B1 | * | 5/2001 | Son | 710/315 |
| 6,339,806 B1 | * | 1/2002 | Foster et al. | 710/313 |
| 6,421,752 B1 | * | 7/2002 | Schutte | 710/119 |
| 6,448,671 B1 | * | 9/2002 | Wallace et al. | 307/10.1 |
| 6,629,172 B1 | * | 9/2003 | Andersson et al. | 710/104 |
| 6,725,320 B1 | * | 4/2004 | Barenys et al. | 710/316 |
| 6,745,270 B1 | * | 6/2004 | Barenys et al. | 710/104 |
| 6,769,078 B1 | * | 7/2004 | Barenys et al. | 714/43 |
| 6,816,939 B1 | * | 11/2004 | Bandholz et al. | 710/305 |
| 6,842,806 B1 | * | 1/2005 | Ervin | 710/110 |
| 6,874,050 B1 | * | 3/2005 | Tangen | 710/300 |
| 6,928,584 B1 | * | 8/2005 | Labana | 714/13 |

(Continued)

FOREIGN PATENT DOCUMENTS

WO   WO 2063480 A2  *  8/2002

*Primary Examiner*—Paul R. Myers
*Assistant Examiner*—Ryan Stiglic
(74) *Attorney, Agent, or Firm*—Duke W. Yee; Mark E. McBurney; Betty Formby (57) ABSTRACT

An I²C device is disclosed that includes a main I²C section, bus switches, switch logic, and address logic as part of the I²C device. The I²C device is coupled to an I²C bus for communicating with other I²C devices and an I²C bus controller that is also on the I²C bus. The switch logic controls a current position of the switches. The I²C device is coupled to the I²C bus utilizing the switches. The switches control whether the main I²C section, the address logic, the switch logic, or a combination of the main I²C section, address logic, and switch logic is currently coupled to I²C bus. The switches also can be used, if desired to remove from the buss all devices that are downstream from a given device containing switches. The address logic is used to receive and store the address of the I²C device. The I²C device will respond to the address that is stored in its address logic.

24 Claims, 5 Drawing Sheets

U.S. PATENT DOCUMENTS

| | | |
|---|---|---|
| 6,944,695 B1 * | 9/2005 | Tangen ....................... 710/107 |
| 6,996,750 B1 * | 2/2006 | Tetreault ...................... 714/44 |
| 2002/0083255 A1 * | 6/2002 | Greeff et al. ................ 710/305 |
| 2002/0108076 A1 * | 8/2002 | Barenys et al. ............... 714/43 |
| 2003/0212847 A1 * | 11/2003 | Bandholz et al. ........... 710/305 |
| 2004/0036808 A1 * | 2/2004 | Lendaro ...................... 348/725 |
| 2004/0059852 A1 * | 3/2004 | Sun et al. ................... 710/110 |
| 2004/0225812 A1 * | 11/2004 | Ervin ......................... 710/305 |

* cited by examiner

I²C DEVICE INCLUDING BUS SWITCHES AND PROGRAMMABLE ADDRESS

CROSS-REFERENCE TO RELATED APPLICATIONS

The subject matter of the present invention is related to copending U.S. application Ser. No. 09/779,364, entitled I2C SELF BUS SWITCHING DEVICE, filed on Feb. 8, 2001; Ser. No. 09/779,368, entitled METHOD FOR ISOLATING AN I2C BUS FAULT USING SELF BUS SWITCHING DEVICE, filed on Feb. 8, 2001; and Ser. No. 09/773,185, entitled DYNAMICALLY ALLOCATING I2C ADDRESSES USING SELF BUS SWITCHING DEVICE, filed on Jan. 31, 2001, all of which being assigned to the same assignee and all of which incorporated herein by reference.

BACKGROUND OF THE INVENTION

1. Technical Field

The present invention relates to computer bus architecture. More specifically, the present invention relates to Inter Integrated Circuit (I²C) buses.

2. Description of Related Art

Many similarities exist between seemingly unrelated designs in consumer, industrial and telecommunication electronics. Examples of similarities include intelligent control, general-purpose circuits (i.e. LCD drivers, I/O ports, RAM) and application-oriented circuits. The Philips Inter Integrated Circuit (I²C) bus is a bi-directional two-wire serial bus designed to exploit these similarities.

Devices on the I²C bus are accessed by individual addresses, 00-FF (even addresses for Writes, odd addresses for reads). The I²C architecture can be used for a variety of functions. One example is Vital Product Data (VPD). Each component in the system contains a small Electrically Erasable Programmable Read Only Memory (EEPROM) (typically 256 bytes) which contains the VPD information such as serial numbers, part numbers, and engineering change revision level.

I²C busses can connect a number of devices simultaneously to the same pair of bus wires. Normally, the device addresses on the I²C bus are predefined by hardwiring on the circuit boards. A limitation of the I²C bus is that it will only allow a single device to respond to each even address between 00 and FF. All addresses are even because only the high-order seven bits of the address byte are used for the address. Bit 0 is used to indicate whether the operation is to be a read or a write. Therefore, there are a limited number of addresses that can be assigned to a device.

Many I²C devices have their high-order four address bits predefined. The remaining three address bits are assigned with the use of strapping pins on the device. For example, most I²C accessible EEPROMs have three strapping pins which limit their addresses to the even addresses between A0–AF. This permits eight unique addresses for a given chip of that type. Thus, only eight of these devices may be connected to a single bus and still each have a unique address.

In addition to address conflicts, a problem results when one of the devices malfunctions and pulls a bus signal (clock or data) low. The bus will not operate, and it is very difficult to determine which of the numerous devices connected to the I²C bus is responsible. A similar problem occurs when one of the bus conductors becomes shorted to a low impedance source, such as, for example, ground.

Therefore, a need exists for an I²C device that includes bus switches and that may be addressed using a reprogrammable device address.

SUMMARY OF THE INVENTION

An I²C device is disclosed that includes a main I²C section, bus switches, switch logic, and address logic as part of the I²C device. The I²C device is coupled to an I²C bus for communicating with other I²C devices and to an I²C bus controller that is also coupled to the I²C bus. The switch logic controls a current position of the switches. The I²C device is coupled to the I²C bus utilizing the switches. The switches control whether the main I²C section, the address logic, the switch logic, or a combination of the main I²C section, address logic, and switch logic is currently coupled to I²C bus. The address logic is used to receive and store the address of the I²C device. Thus, the device address can be redefined or reprogrammed. The I²C device will respond to the address that is stored in its address logic. Thus, the I²C device's address is the address that is stored in its address logic.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
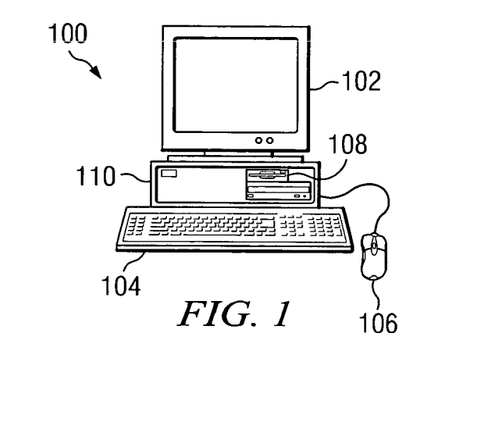
FIG. 1 depicts a pictorial representation of a data processing system in which the present invention may be implemented in accordance with the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
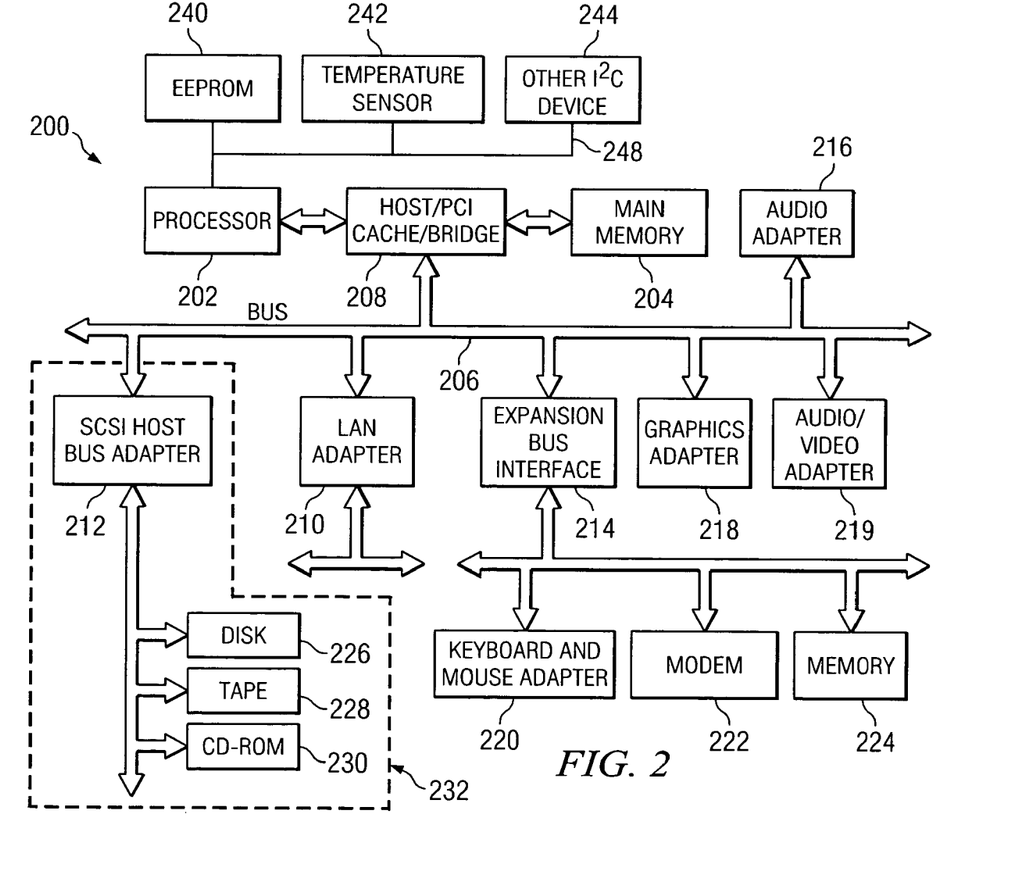
FIG. 2 illustrates a block diagram of a data processing system in which the present invention may be implemented in accordance with the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs an I$^2$C bus architecture. The I$^2$C bus 248 is a bi-directional serial bus requiring only two wires: a serial data line (SDA) and a serial clock line (SCL). Although serial buses do not have the throughput capability of parallel buses, serial buses require less wiring and fewer Integrated Circuit (IC) connector pins. Each device (processor 202, electronically erasable and programmable read only memory (EEPROM) 240, temperature sensor 242, and any other I$^2$C device 244) connected to I$^2$C bus 248 is software addressable by a unique address. The devices can operate as either transmitters or receivers. All I$^2$C bus compatible devices have an on-chip interface which allows the devices to communicate directly with each other via the I$^2$C bus 248. A simple master/slave relationship exists at all times. A master is a device which initiates a data transfer and the clock signals to permit the transfer, and any device addressed at the time of transfer is considered a slave. The I$^2$C bus is a multimaster bus, meaning more than one device capable of controlling the bus can be connected to it. However, the present implementation is operated in a single-master mode.

Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to local bus 206 by direct component connection. In contrast, audio adapter 216, graphics adapter 218, and audio/video adapter 219 are connected to local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
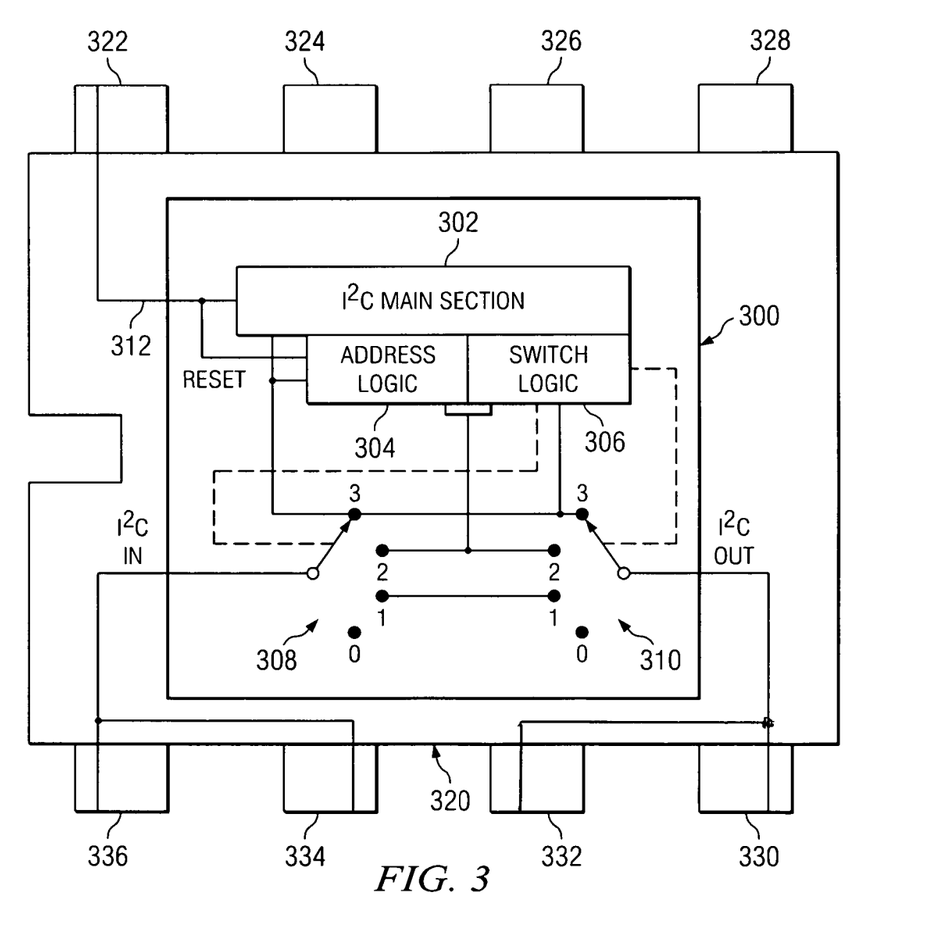
FIG. 3 depicts a schematic diagram of an integrated circuit that includes an I²C device that has address logic and bus switches in accordance with the present invention.

FIG. 3 depicts a schematic diagram of an integrated circuit chip that includes an I$^2$C device that has address logic and bus switches in accordance with the present invention. I$^2$C device 300 includes a main I$^2$C section 302, address logic 304, switch logic 306, IN switch pair 308, and OUT switch pair 310. I$^2$C main section 302 is an I$^2$C device such as known in the prior art that adheres to the I$^2$C standard.

In the prior art, one or more I$^2$C devices, such as main section 302, are coupled together using an I$^2$C bus to communicate with each other. According to the present invention, switch pairs 308 and 310, address logic 304 and switch logic 306 are added to main section 302 to create a new I$^2$C device 300. Thus, one or more I$^2$C devices 300 may be coupled together using an I$^2$C bus to communicate with each other.

An IN switch pair 308 and an OUT switch pair 310 are also included which are controlled by switch logic 306 in order to control which portions of I$^2$C device 300 are coupled to the I$^2$C bus as well as whether or not I$^2$C device 300 communicates on the I$^2$C bus at all. In addition, by selecting particular switch positions, I$^2$C device 300 can control whether or not devices coupled to the I$^2$C bus downstream from I$^2$C device 300 can communicate on the I$^2$C bus.

I$^2$C devices that receive a signal on the I$^2$C bus after a particular I$^2$C device has received the signal are considered to be "downstream" from the particular I$^2$C device.

Since an I²C bus is comprised of two signal lines, Clock and Data, the IN and OUT switches are each comprised of a pair of rotary switches. Each one of the IN and OUT switches is a double pole rotary switch. One of the poles in the IN pair is for the Clock signal and the other is for the Data signal. The same is true of the OUT switch.

For simplicity, the drawings and corresponding description indicate that the two signals combined as the "I²C bus communication bus", "I²C bus signals", or "I²C signals" and the double pole rotary switches will simply be referred to herein as "switch" or "switches".

Each switch may, independently of the position of the other switch, be in one of four different positions, position 0, 1, 2, or 3. Thus, IN switch 308 may be in either position 0, 1, 2, or 3 while OUT switch 310 may be in either position 0, 1, 2, or 3.

Switch positions are controlled by switch logic 306. Thus, switch logic 306 receives a command and then causes one or both switches 308, 310 to change their position.

A reset signal 312 may be received by main section 302 and address logic 304. When reset signal 312 is received, switch logic 306 causes both IN switch 308 and OUT switch 310 to move to position 3 if they are not in position 3 already.

I²C device 300 is included within an integrated circuit 320. Various parts of I²C device 300 are accessible utilizing one of the pins 322–336 of integrated circuit 320. For example, reset signal 312 may be received utilizing pin 322. The I²C communication bus is input to I²C device 300 utilizing pins 336 and 334 for the Clock and Data signals and is output from I²C device 300 utilizing pins 332 and 330. In this manner, multiple devices, such as I²C device 300, may be coupled serially together by coupling an output of the I²C bus for one I²C device to an input for the bus for another I²C device.

Address logic 304 is used by an I²C device 300 to receive and store the address of I²C device 300. I²C device 300 will respond to the address that is stored in its address logic. The address stored in address logic 304 is programmable. Thus, I²C device 300 may receive a new address and then store that address in its address logic 306. I²C device 300 will then respond to this new address. In this manner, the address of I²C device 300 is reprogrammable to a new address received via the I²C bus.

A typical I²C address is a seven-bit address. The lower-order three bits are typically hardwired using pins. The present invention may be used to override, and thus reprogram, any or all of these seven bits. Thus, any or all of the three lower-order hardwired address pins can be overridden by storing a new address in the address logic that changes just the lower-order bits. As another example, only the higher-order four address bits could be overridden using the present invention, thus preserving the hardwired bits.

Figure 4:
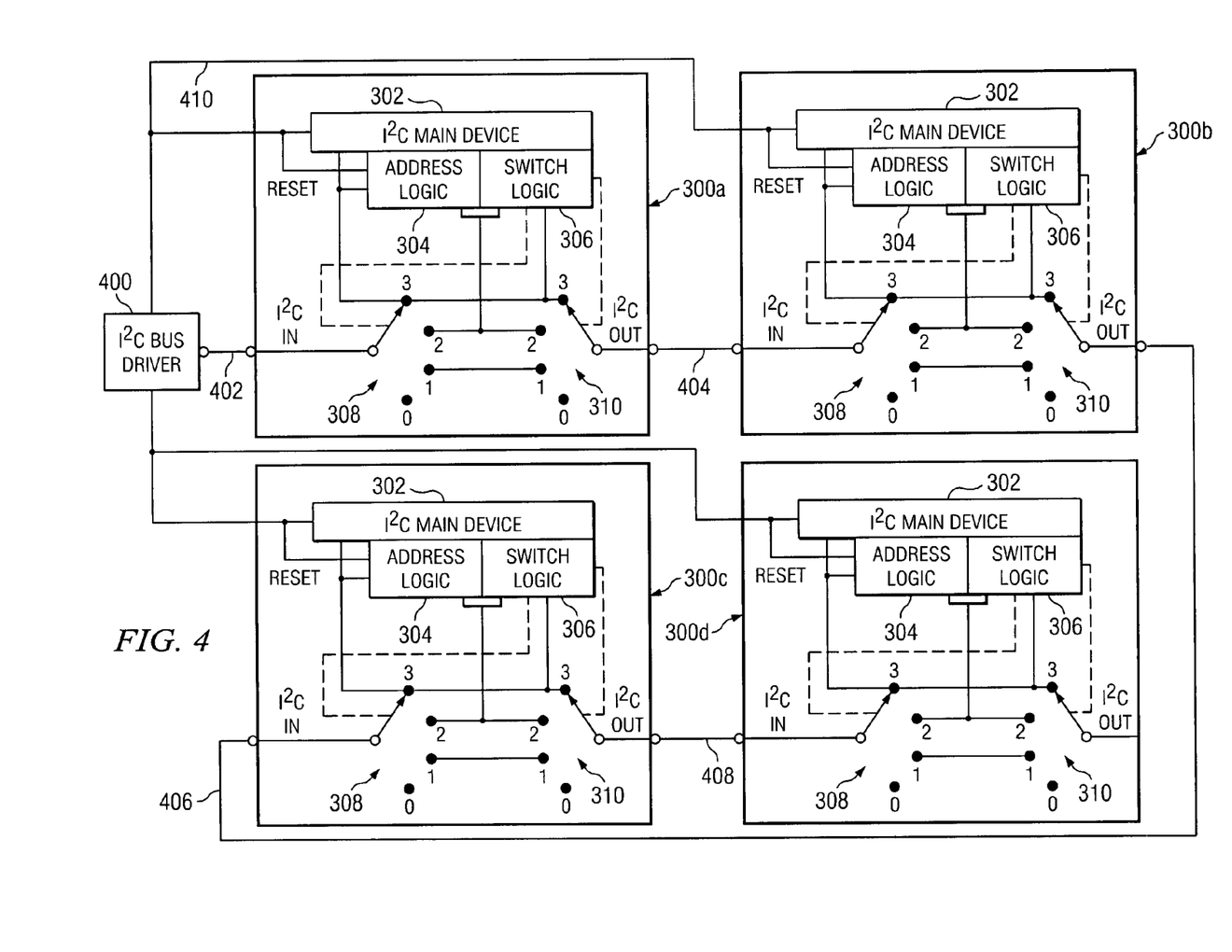
FIG. 4 illustrates multiple I²C devices coupled together utilizing a communications bus in accordance with the present invention.

For example, FIG. 4 illustrates multiple I²C devices coupled together utilizing an I²C bus in accordance with the present invention. The I²C bus is a communications bus that is used by the various I²C devices 300a–d to communicate with each other. A bus driver 400 controls an I²C bus. The I²C bus is a serial bus. Therefore, each device 300a–d receives an incoming I²C bus signal, and then outputs an outgoing I²C bus signal which is then received by another device 300 as an incoming I²C bus signal.

The I²C bus signal is first received, via I²C bus segment 402, as an input to device 300a. I²C bus segment 404 is used to output an I²C bus signal from device 300a to be received as an input by device 300b. Device 300b outputs an I²C bus signal via I²C bus segment 406 which is then received as an input by device 300c. Device 300c then outputs an I²C bus signal via I²C bus segment 408 which is received as an input by device 300d.

A reset signal 410 is output from bus driver 400 and received by each device 300a–d.

Referring again to FIG. 3, the following discussion of switch positions applies to the switches of any of the devices 300a–d. Each IN switch receives an incoming I²C bus signal. If an output I²C bus signal is provided by a device 300, that signal is output through an OUT switch.

When both IN 308 and OUT 310 switches are in position 3, the I²C bus signal received at IN switch 308 will pass through device 300 and be made available as an output from switch 310 on pin 330 to any device downstream that is connected to this device. The I²C bus signal is received by main section 302, address logic 304, and switch logic 306. When the switches are in position 3, main section 302 is active and available. The address of device 300 may be programmed, and the switches may be controlled by switch logic 306.

When both IN 308 and OUT 310 switches are in position 2, the I²C bus signal received at IN switch 308 will pass through device 300 and be made available as an output from switch 310 on pin 330 to any device downstream that is connected to this device. The I²C bus signal is received by address logic 304 and switch logic 306. Main section 302 is disconnected from the bus and will not receive the bus signal. When the switches are in position 2, main section 302 is inactive and unavailable. However, address logic 304 and switch logic 306 are both active and available. Therefore, the address of device 300 may be programmed, and the switches may be controlled by switch logic 306 when the switches are both in position 2.

When both IN 308 and OUT 310 switches are in position 1, the I²C bus signal received at IN switch 308 will pass through device 300 and be made available as an output from switch 310 on pin 330 to any device downstream that is connected to this device. The I²C bus signal is not received by main section 302, address logic 304, or switch logic 306. Main section 302, address logic 304, and switch logic 306 are all disconnected from the bus and will not receive the bus signal. Therefore, when the switches are in position 1, the address of device 300 may not be programmed, and the switches cannot be controlled by switch logic 306. When the switches are in position 1, device 300 is logically removed from the I²C bus. In addition, most of the device's 300 ability to create a bus fault is removed for diagnostic purposes.

When OUT switch 310 is in position 0, all downstream devices are removed from the bus. Thus, the I²C bus signal received at IN switch 308 will not be made available as an output from switch 310 to any device downstream that is connected to this device. If the IN switch is in position 3, the I²C bus received at IN switch 308 will be received by main section 302, address logic 304, and switch logic 306. If the IN switch is in position 2, the I²C bus received at IN switch 308 will be received by address logic 304 and switch logic 306. However, if the OUT switch 310 is in position 0, regardless of the position of IN switch 308, the bus signal will not be sent to any device downstream that is coupled to the output of device 300.

When IN switch 308 is in position 0, all downstream devices are removed from the bus. In addition, device 300 is removed from the bus and will not receive the I²C bus signal. Thus, the I²C bus signal received at IN switch 308 will not be received by main section 302, address logic 304, or switch logic 306. In addition, the bus signal will not be sent to any device downstream that is coupled to the output of device 300.

Referring again to FIG. 4, as an example, suppose both IN and OUT switches of device 300a are in position 3, the bus signal received on segment 402 will be output on segment 404 and received at device's 300b IN switch.

Now suppose both switches of device 300b are in position 3, the bus signal will be received by the main section, address logic, and switch logic of device 300b, and then output on segment 406.

If both switches of device 300b are in position 2, the bus signal will be received by only the address logic and switch logic, and not the main section, of device 300b. The bus signal will also be output on segment 406.

If both switches of device 300b are in position 1, the bus signal will not be received by main section, address logic, or switch logic of device 300b. The bus signal will, however, pass from the IN switch to the OUT switch of device 300b and be output on segment 406.

If the IN switch of device 300b is in position 0, the main section, address logic, and switch logic of device 300b will not receive the bus signal. In addition, the bus signal will not be output on segment 406. Therefore, devices 300c and 300d will not receive the bus signal and are, therefore, logically removed from the bus.

If the OUT switch of device 300b is in position 0 and the IN switch is in position 3, the main section, address logic, and switch logic of device 300 will receive the signal, but the signal will not be output on segment 406. Therefore, devices 300c and 300d will not receive the bus signal and are, therefore, logically removed from the bus.

If the OUT switch of device 300b is in position 0 and the IN switch is in position 2, the address logic and switch logic of device 300 will receive the signal, but the signal will not be output on segment 406. Therefore, devices 300c and 300d will not receive the bus signal and are, therefore, logically removed from the bus.

Figure 5:
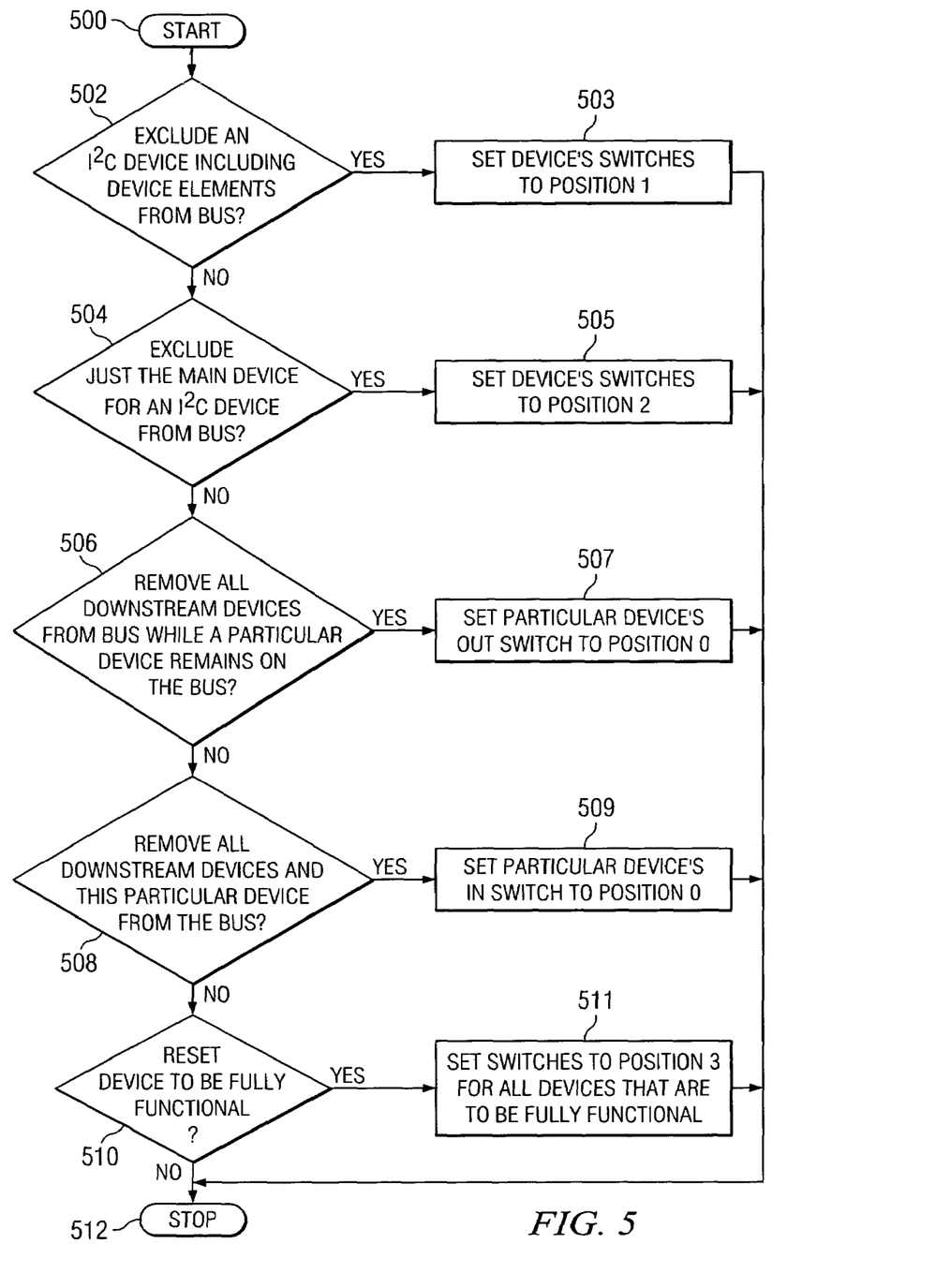
FIG. 5 depicts a high level flow chart which illustrates programming bus switches that are included within an I²C device in accordance with the present invention.

FIG. 5 depicts a high level flow chart which illustrates programming bus switches that are included within an I²C device in accordance with the present invention. The process starts as depicted by block 500 and thereafter passes to block 502 which illustrates a determination of whether or not an instruction has been received by an I²C device 300 to exclude the I²C device including all of its elements, including its main section, address logic, and switch logic, from the I²C bus, while still passing I²C bus traffic to downstream I²C devices. If a determination is made that an instruction has been received to exclude the I²C device including all of its elements from the I²C bus while still passing I²C bus traffic, the process passes to block 503 which depicts setting both switches of the I²C device 300 to position 1. Thus, all of the elements including in this I²C device, including its main section, address logic, and switch logic will be removed from the I²C bus. The I²C bus traffic will continue to pass through this I²C device and be received by I²C devices downstream. The process then terminates as illustrated by block 512.

Referring again to block 502, if a determination is made that an instruction to exclude the I²C device including all of its elements from the I²C bus while still passing I²C bus traffic to downstream devices has not been received, the process passes to block 504. Block 504 depicts a determination of whether or not an instruction has been received by an I²C device 300 to exclude just the I²C device's main section from the I²C bus while permitting bus traffic to still be received by the address logic and switch logic and be passed to downstream I²C devices. If a determination is made that an instruction has been received to exclude just the main section from the I²C bus while bus traffic is passed to downstream I²C devices, the process passes to block 505 which illustrates setting the positions of both switches of this I²C device to position 2. The process then terminates as depicted by block 512.

Referring again to block 504, if a determination is made that an instruction has not been received to exclude just the I²C device's main section from the I²C bus while bus traffic is passed to downstream I²C devices, the process passes to block 506. Block 506 depicts a determination of whether or not an instruction has been received by an I²C device 300 to remove all I²C devices that are downstream from this I²C device while this I²C device including all of its elements remain on the bus receiving bus traffic. If a determination is made that an instruction has been received by an I²C device 300 to remove all I²C devices that are downstream from this I²C device while this I²C device including all of its elements remain on the bus receiving bus traffic, the process passes to block 507 which illustrates setting the OUT switch for this I²C device to position 0. The process then terminates as depicted by block 512.

Referring again to block 506, if a determination is made that an instruction has not been received by an I²C device 300 to remove all I²C devices that are downstream from this I²C device while this I²C device including all of its elements remain on the bus receiving bus traffic, the process passes to block 508. Block 508 illustrates a determination of whether or not an instruction has been received by an I²C device to remove all I²C devices that are downstream from this I²C device as well as this I²C device. If a determination is made that an instruction has been received by an I²C device to remove all I²C devices that are downstream from this I²C device as well as this I²C device, the process passes to block 509 which depicts setting the IN switch for this I²C device to position 0. The process then terminates as illustrated by block 512.

Referring again to block 508, if a determination is made that an instruction has not been received by an I²C device to remove all I²C devices that are downstream from this I²C device as well as this I²C device, the process passes to block 510. Block 510 illustrates a determination of whether or not an instruction has been received to reset one or more I²C devices. If a determination is made that an instruction has been received to reset one or more I²C devices, the process passes to block 511 which depicts setting both switches for any I²C device that is to be reset to position 3. Any I²C device that has both switches in position 3 will be fully functional, capable of receiving bus traffic by its main section, address logic, and switch logic, and will pass I²C bus traffic to the next I²C device downstream from this I²C device. The process then terminates as depicted by block 512.

Referring again to block 510, if a determination is made that an instruction has not been received to reset one or more I²C devices, the process then terminates as depicted by block 512.

Figure 6:
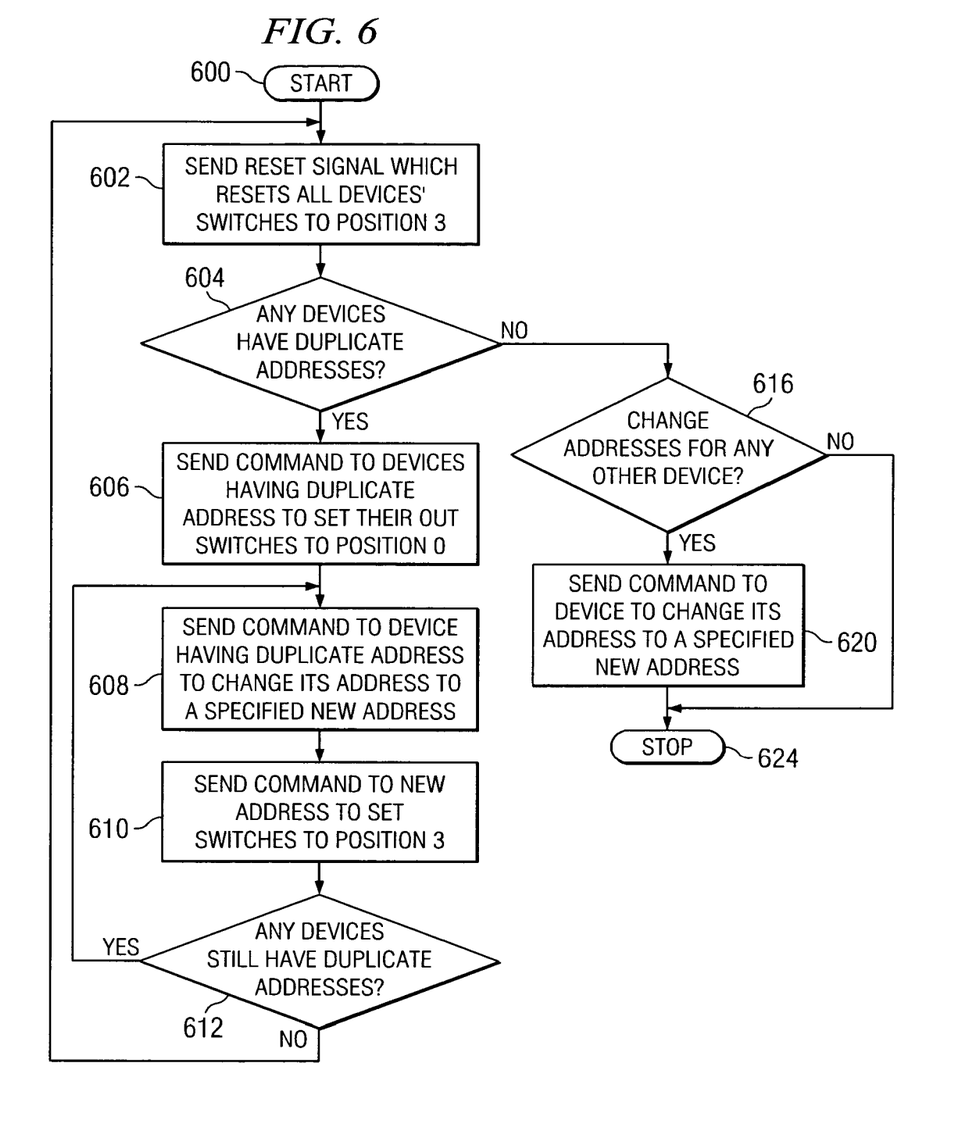
FIG. 6 illustrates a high level flow chart which depicts reprogramming addresses of one or more I²C devices in accordance with the present invention.

FIG. 6 illustrates a high level flow chart which depicts reprogramming addresses of one or more I²C devices in accordance with the present invention. The process starts as depicted by block 600 and thereafter passes to block 602 which illustrates sending a reset signal to all I²C devices. This reset signal will cause the switches in all I²C devices to be set to position 3 making all I²C devices fully functional. Next, block 604 depicts a determination of whether or not any of the I²C devices have duplicate addresses. If a determination is made that none of the I²C devices have duplicate addresses, the process passes to block 616.

Referring again to block 616, if a determination is made that at least two of the I²C devices have duplicate addresses, the process passes to block 606 which illustrates sending a command to the I²C devices that have duplicate addresses to set their OUT switches to position 0. Thus, such a command is broadcast on the I²C bus to the duplicate address.

Each device 300 monitors the I²C bus and will respond to its own address. When an address conflict occurs, i.e. when two or more devices have the same address, all of those devices having this address will respond to the address. Thus, if a command to set OUT switches to position 0 is broadcast to the duplicate address, all of the I²C devices having the duplicate address will respond to the command by setting their OUT switches to position 0.

Next, block 608 depicts sending a command to the duplicate address to change its address to a specified new address. Because all I²C devices having the duplicate address have removed downstream devices from the I²C bus when their OUT switch was set to position 0, only the first I²C device on the bus from the bus driver that has the duplicate address will receive this command to change its address. This I²C device that is first on the serial bus from the bus driver will change its address to the new address. However, the remaining I²C devices on the bus having the duplicate address will continue to have what was originally the duplicate address. Block 610, then, illustrates sending a command to this new address to set the switches in the I²C device to position 3 to make the device fully functional and permit downstream I²C devices to receive bus traffic.

Now, the second device having the previously duplicate address is reconnected to the bus. If it is the only device still having that address, nothing more needs to be done as it is no longer an address shared by another device.

Thereafter, block 612 depicts a determination of whether or not any more of the I²C devices have duplicate addresses. If a determination is made that one or more of the I²C devices still have duplicate addresses, the process passes back to block 608. This process loop continues until only one device has the original duplicate address which is then a unique address. Once a set of duplicate addresses is dealt with in the manner described above, the process then passes back to block 602.

Referring again to block 604, if none of the devices have duplicate addresses, the process passes to block 616 which depicts a determination of whether or not any addresses for other I²C devices should be changed. If a determination is made that no other addresses need to be changed, the process terminates as illustrated by block 624.

Referring again to block 616, if a determination is made that the address for another I²C device needs to be changed, the process passes to block 620 which depicts sending a command to this I²C device to change its address to a new address. The process then terminates as depicted by block 624.

The device depicted herein is given merely by way of example and is not intended as an architectural limitation to the present invention. Other embodiments of a device including switches may include different numbers of pins and include other components not shown.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A device coupled to a serial communications bus, comprising:
   a main section;
   address logic;
   switches;
   switch logic for controlling a current position of said switches coupled to said switch logic;
   said switches being coupled to said communications bus;
   said switches controlling whether said main section, said address logic, said switch logic, or a combination of said main section, address logic, and switch logic is currently coupled to said communications bus; and
   said main section being logcally removed from said communications bus when said switches are in a first position; and
   said address logic and said switch logic remaining logically connected to said communications bus when said switches are in a first position.

2. The device according to claim 1, further comprising: said device being an I2C device.

3. The device according to claim 1, further comprising: said communications bus having only a clock signal line and a data signal line.

4. The device according to claim 1, further comprising: said main section, said address logic, and said switch logic being logically removed from said communications bus when said switches are in a second position.

5. The device according to claim 1, further comprising: said main section, said address logic, and said switch logic being logically connected to said communications bus when said switches are in a third position.

6. The device according to claim 1, further comprising: said switches including an input switch device and an output switch device.

7. The device according to claim 6, further comprising: said communications bus having only a clock signal line and a data signal line; said input switch device being a double pole rotary switch having a first pole coupled to said data signal line and a second pole coupled to said clock signal line; and said output switch device being a double pole rotary switch having a first pole coupled to said data signal line and a second pole coupled to said clock signal line.

8. The device according to claim 1, further comprising: at least one second device coupled to said communications bus after said device; said switches including an input switch device and an output switch device; said main section, said address logic, and said switch logic being logically connected to said communications bus when said input switch device is in a third position; and said at least one second device being logically removed from said communication bus when said output switch device is in said second position.

9. The device according to claim 1, further comprising: at least one second device coupled to said communications bus after said device; said switches including an input switch device and an output switch device; said main section, said address logic, and said switch logic being logically removed from said communications bus when said input switch device is in a fourth position; and said at least one second device being logically removed from said communication bus when said output switch device is in said second position.

10. The device according to claim 1, further comprising: said address logic for storing an address for said device, said device being addressed on said communications bus utilizing said address.

11. The device according to claim 10, further comprising: said device having a hardwired address; and
said address stored in said address logic overriding any of the bits of said hardwired address.

12. A method for utilizing a device coupled to a serial communications bus, comprising:
said device including a main section, address logic, switches, and switch logic;
coupling said device to said communications bus utilizing said switches;
controlling a current position of said switches utilizing said switch logic;
controlling whether said main section, said address logic, said switch logic, or a combination of said main section, address logic, and switch logic is currently coupled to said communications bus utilizing said switch logic;
logically removing said main section from said communications bus when said switches are in a first position; and
logically connecting said address logic and said switch logic remaining to said communications bus when said switches are in a first position.

13. The method according to claim 12, further comprising:
said communications bus having only a clock signal line and a data signal line.

14. The method according to claim 12, further comprising:
logically removing said main section, said address logic, and said switch logic from said communications bus when said switches are in a second position.

15. The method according to claim 12, further comprising:
logically connecting said main section, said address logic, and said switch logic to said communications bus when said switches are in a third position.

16. The method according to claim 12, further comprising:
said switches including an input switch device and an output switch device.

17. The method according to claim 16, further comprising:
said communications bus having only a clock signal line and a data signal line;
said input switch device being a double pole rotary switch;
coupling a first pole of said input switch device to said data signal line and a second pole of said input switch device to said clock signal line;
said output switch device being a double pole rotary switch; and
coupling a first pole of said output switch device to said data signal line and a second pole of said output switch device to said clock signal line.

18. The method according to claim 12, further comprising: coupling at least one second device to said communications bus after said device; said switches including an input switch device and an output switch device; logically connecting said main section, said address logic, and said switch logic to said communications bus when said input switch device is in a third position; and logically removing said at least one second device from said communication bus when said output switch device is in said second position.

19. The method according to claim 12, further comprising: coupling at least one second device to said communications bus after said device; said switches including an input switch device and an output switch device; logically removing said main section, said address logic, and said switch logic from said communications bus when said input switch device is in a fourth position; and logically removing said at least one second device from said communication bus when said output switch device is in said second position.

20. The method according to claim 12, further comprising:
storing an address in said address logic for said device; and
addressing said device on said communications bus utilizing said stored address.

21. The method according to claim 12, further comprising:
said device having a hardwired address; and
overriding any of the bits of said hardwired address using said address stored in said address logic.

22. The method according to claim 12, further comprising:
coupling a plurality of devices to said communication bus;
determining whether any of said plurality of devices are addressed utilizing a duplicate address;
in response to determining that at least two of said plurality of devices are addressed utilizing said duplicate address, sending a command to said at least two of said plurality of devices to remove all of said plurality of devices that are downstream from said at least two of said plurality of devices from said communications bus;
storing a first new address in address logic included in a first one of said at least two of said plurality of devices;
sending a command to said plurality of devices to logically connect said plurality of devices to said communications bus.

23. The method according to claim 12, further comprising:
coupling a plurality of devices to said communication bus;
determining whether an address of one of said plurality of devices is to be changed;
in response to determining that said address of said one of said plurality of devices is to be changed, storing a new address in address logic included in said one of said plurality of devices; and
addressing said one of said plurality of devices utilizing said new address.

24. The device according to claim 1, further comprising: at least one second device coupled to said communications bus after said device; said switches including an input switch device and an output switch device; said main section, said address logic, and said switch logic being logically removed from said communications bus when said input switch device is in a fourth position; and said at least one second device being logically connected to said communication bus when said output switch device is in said fourth position.

* * * * *